United States Patent [19]
Salmon

[11] Patent Number: 5,348,623
[45] Date of Patent: Sep. 20, 1994

[54] WATER HEATING AND DISTILLING APPARATUS

[75] Inventor: Michael E. Salmon, Spartanburg, S.C.

[73] Assignee: Terrill Designs, Inc., Spartanburg, S.C.

[21] Appl. No.: 954,692

[22] Filed: Sep. 30, 1992

Related U.S. Application Data

[63] Continuation of Ser. No. 541,043, Jun. 20, 1990, abandoned, which is a continuation-in-part of Ser. No. 282,026, Dec. 9, 1988, Pat. No. 4,946,558.

[51] Int. Cl.$^5$ .............................................. B01D 3/42
[52] U.S. Cl. ................................... 203/1; 159/44; 202/160; 202/176; 202/167; 202/206; 203/2; 203/10; 203/22; 203/27; 203/98; 203/DIG. 18; 392/402; 392/403; 392/405; 392/456
[58] Field of Search .................... 203/10, 1, 2, 3, 98, 203/DIG. 18, 22, 4, 27, DIG. 8; 202/176, 160, 166, 167, 189, 206, 181, 197, 196; 392/401, 403, 405, 402, 406, 456; 159/44

[56] References Cited

U.S. PATENT DOCUMENTS

| | | | |
|---|---|---|---|
| 797,255 | 8/1905 | Beers | 202/165 |
| 1,779,128 | 10/1930 | Handley | 392/456 |
| 1,862,065 | 6/1932 | Rowe | 392/456 |
| 1,950,113 | 3/1934 | Kirkwood | 392/456 |
| 3,468,292 | 9/1969 | Ferraro et al. | 392/456 |
| 3,505,173 | 4/1970 | Randell | 202/189 |
| 3,896,004 | 7/1975 | Rodgers . | |
| 4,052,267 | 10/1977 | McFee | 203/10 |
| 4,342,625 | 8/1982 | Dennison | 202/181 |
| 4,549,936 | 10/1985 | Erickson | 202/167 |
| 4,601,789 | 7/1986 | Bjorklund | 202/167 |
| 4,687,550 | 8/1987 | Wong | 202/165 |
| 4,690,102 | 9/1987 | Sundquist | 122/20 B |
| 4,861,435 | 8/1989 | Sweet | 202/180 |
| 4,882,012 | 11/1989 | Wasserman | 203/10 |
| 4,906,337 | 3/1990 | Palmer | 202/166 |
| 4,946,558 | 8/1990 | Salmon | 202/167 |
| 4,985,122 | 1/1991 | Spencer | 203/11 |

FOREIGN PATENT DOCUMENTS 0559201 9/1932 Fed. Rep. of Germany ...... 392/456

*Primary Examiner*—Virginia Manoharan
*Attorney, Agent, or Firm*—Brooks & Kushman

[57] ABSTRACT

An automatic water heating and distilling apparatus is provided having a hot water reservoir, an evaporator tank, a condenser, a distilled water reservoir and a control mechanism. Water is boiled within the evaporator tank generating steam which is condensed in the condenser to form distilled water. The heat rejected during condensation is transferred into the hot water reservoir. The distilled water reservoir has an input coupled to the condenser, an output for distilled water, and an overflow so that excess distilled water is returned to the evaporator tank. The control mechanism automatically regulates the operation of a heater within the evaporator to maintain the water in the hot water reservoir within a selected operating range. Various alternative embodiments are also described including a hot water heating apparatus utilizing an enclosed heat transfer device partially filled with liquid having a boiling point above the selected temperature for the water to be heated. A heat transfer device is provided with a reservoir portion for accumulating liquid and a relatively higher condensive portion in cooperation with the hot water reservoir. A heater, a temperature sensor, and a control mechanism are likewise provided to automatically maintain the water in the hot water reservoir within a selected temperature range.

17 Claims, 4 Drawing Sheets

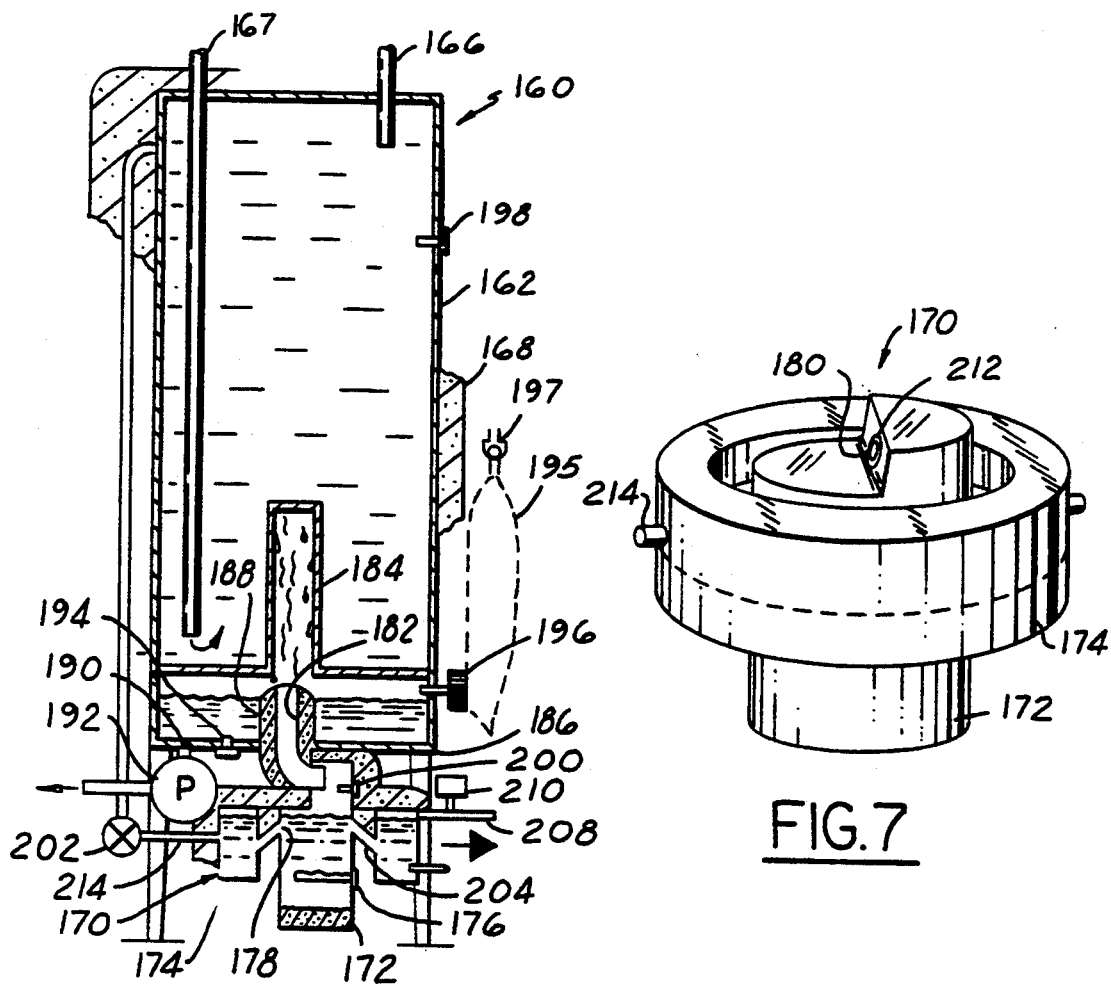
FIG.6
FIG.7
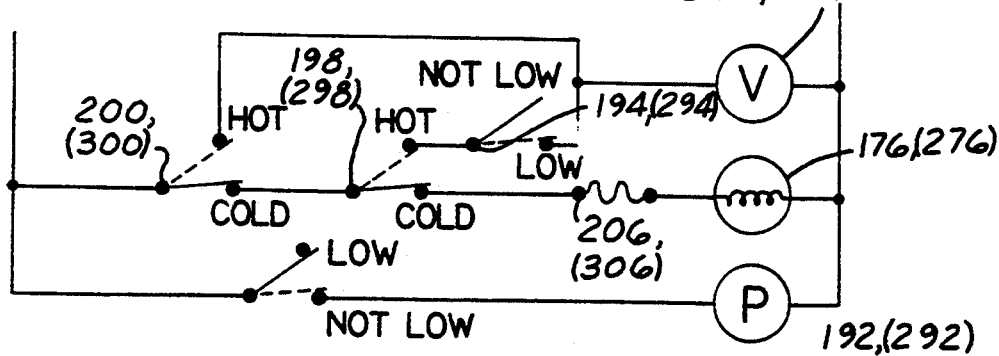
FIG.8

1

WATER HEATING AND DISTILLING APPARATUS

RELATED APPLICATIONS

This application is a continuation of application Ser. No. 07/541,043, filed on Jun. 20, 1990, now abandoned which is a continuation-in-part of commonly owned co-pending U.S. patent application Ser. No. 282,026, filed Dec. 9, 1988, entitled "Water Distilling Method and Apparatus" now issued as U.S. Pat. No. 4,946,558, which is incorporated by reference herein.

TECHNICAL FIELD

The present invention relates to a water heating and distilling apparatus and more particularly, to devices which use a boiling liquid to transfer heat from a heating element to the hot water within the hot water reservoir.

BACKGROUND ART

Residential water distillers have gained in popularity as a result of an increased concern about drinking water quality. By far, the most common type of residential distiller is the counter-top design generally shown in U.S. Pat. No. 4,052,267 to McFee. Counter-top distillers, while inexpensive to purchase, consume large amounts of energy which is exhausted into the atmosphere. In the case of air conditioned homes, not only is the energy exhausted to the atmosphere wasted, but additional energy is also needed to cool the house. In order to minimize the energy dissipated into the room, there have been efforts to develop a water distiller which is cooled by tap water, which can then be poured down a drain. An example of such a water cooled distiller is shown in U.S. Pat. Nos. 4,342,625 to Dennison and 4,861,435 to Sweet. Water distillers of both water and air cooled designs are relatively inefficient, since large amounts of waste heat are a necessary by-product of the distilling operation.

There have been efforts over the years to utilize waste heat generated from water distilling systems. U.S. Pat. No. 4,601,789 to Bjorklund discloses a combined water distiller/hot water heater, where the latent heat of evaporation released during the condensation process is used to heat hot water. U.S. Pat. No. 4,549,936 to Erickson discloses a rather complex distillation system which is attached to a hot water heater and uses a pair of pumps to generate a sub-atmospheric region to cause the heated hot water to boil in the distiller without supplemental heating. U.S. Pat. No. 4,687,550 to Wong discloses a multichamber water distiller which generates atmospheric pressure waste water which is dumped down the sink drain or used as hot water for washing purposes. U.S. Pat. No. 797,255 to Beers illustrates a water distilling apparatus provided with a condensing coil for transferring the heat rejected during distillation to a hot water tank.

DISCLOSURE OF INVENTION

One of the objects of the present invention is provide a hot water distilling mechanism in which the heat rejected during condensation is transferred to a hot water heater to recover energy which is normally wasted.

Another object of the present invention is to provide a combination of water heating in the distilling system in which the hot water system remains pressurized and totally isolated from the atmosphere.

Another object of the present invention is to provide a water distilling apparatus in which a sediment can be accumulated and periodically removed without significantly degrading performance.

Another object of the present invention is to heat water within the hot water reservoir utilizing a heat transfer device having a working fluid which has a boiling point above the temperature of the water to be heated, but not higher than the water within the hot water reservoir to thereby minimize sediment accumulation and scaling within the hot water reservoir.

Another object of the present invention is to provide a water heating and distilling apparatus which is cost efficient to manufacture and is of minimal complexity.

Another object of the present invention is to provide a totally automatic water heating and distilling system which can independently produce distilled water irrespective of hot water usage and produce hot water irrespective of distilled water usage in order to maintain adequate supply of distilled and hot water at all times.

A feature of the present invention is that the system can run automatically with little monitoring and infrequent maintenance.

Accordingly, an automatic hot water heating and distilling apparatus is provided which has an enclosed hot water reservoir, an evaporator tank with a heater therein, a condenser, a distilled water reservoir and a control mechanism. Water is boiled in the evaporator tank by the heater causing the steam generated to flow into the condenser where it is condensed to form distilled water. The distilled water is accumulated in the distilled water reservoir and the heat rejected during condensation is transferred to the water within the hot water reservoir. Excess distilled water is automatically returned from the distilled water reservoir to the evaporator tank. The control mechanism regulates the automatic operation of the heater to maintain the water within the hot water reservoir within a selected temperature range at all times.

An alternative water heating apparatus embodiments utilizes an enclosed heat transfer device which is partially filled with a liquid having a boiling point above a selected temperature of the water to be heated. The heat transfer device has a reservoir portion for accumulating liquid at a relatively higher condensive portion in cooperation with a hot water tank reservoir. A heater is provided for boiling the liquid within the heat transfer device reservoir causing the vapor formed thereby to flow into the condenser portion where it transfers the heat rejected during condensation into the hot water reservoir. A temperature sensor within the hot water reservoir and a control mechanism regulates the operation of the heater to maintain the water in the reservoir within a selected temperature range.

A method for heating and distilling water utilizing a hot water reservoir and an evaporator having heater therein is also provided. The method includes the steps of sensing the temperature in the hot water reservoir, boiling water within the evaporator when the water temperature in the reservoir is below a limit, condensing the steam generated thereby to form distilled water while transferring the heat rejected to the water within the hot water reservoir. The distilled water is accumulated in a distilled water reservoir. The level of a distilled water reservoir is sensed and a control mechanism is provided which automatically regulates the operation of the system allowing additional distilled water to be made when the reservoir level is low regardless of hot water tank temperature by disposing of excess energy in order to prevent the hot water reservoir temperature from exceeding a safe level.

These and other objects, features and advantages of the present invention are described and shown in the accompanying drawings and description.

BRIEF DESCRIPTION OF THE DRAWINGS

FIG. 6 is a cross-sectional side elevation of a third embodiment of the invention which is a combined water heating and distilling apparatus;

FIG. 7 is an enlarged perspective view of the evaporator tank pre-chamber assembly utilized in the third embodiment of the invention;

FIG. 8 is an electrical control diagram utilized in the third embodiment of the invention;

BEST MODES FOR CARRYING OUT THE INVENTION

Hot Water Heater Embodiment

Figure 1:
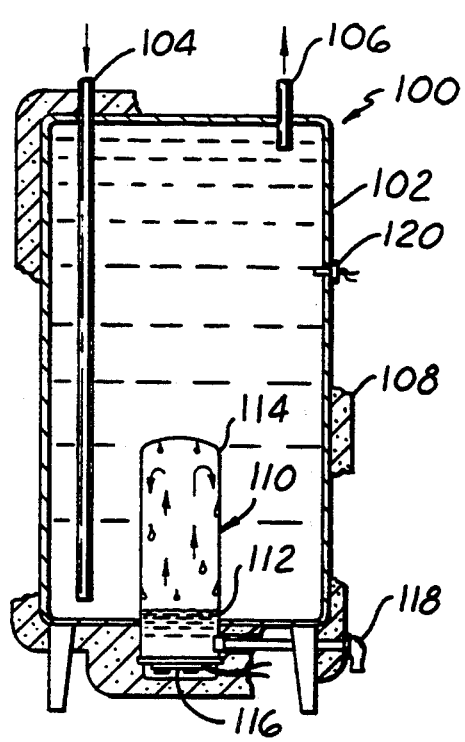
FIG. 1 is a cross-sectional side elevation of an electrically heated first embodiment of the invention.

With references to FIGS. 1-5, two alternative water heater embodiments of the invention are illustrated. A water heater 100 is provided with an enclosed hot water reservoir 102 for holding a volume of water to be heated. Water reservoir 102 has an inlet 104 to be connected to a source of clean pressurized water and a hot water outlet 106 to be connected to the hot water system of a building or the like. Preferably, hot water reservoir inlet introduces cold water near the bottom of the hot water reservoir 102 and hot water reservoir outlet 106 removes hot water from the upper region of hot water reservoir 102 in order to take advantage of a natural stratification within the reservoir caused by temperature gradient. The outer periphery of the hot water heater is covered with an insulation material 108 to minimize energy loss.

The water within the hot water reservoir 102 is heated by an enclosed heat transfer device 110. The heat transfer device is filled with a liquid having a boiling point above the selected temperature that the water in the hot water reservoir is to be heated. Note that boiling temperature is a function of chemical composition of the liquid and pressure. Low boiling temperature liquids can be used if the heat transfer device is pressurized enough to raise the effective boiling point to the desired temperature. The heat transfer device is partially filled with the liquid which is accumulated in the lower reservoir portion 112 and condensed in the higher condenser portion 114. The reservoir portion of the heat transfer device is in cooperation with a heating element 116. The heating element boils the liquid within the heat transfer device causing the vapor to rise into the condenser portion 114 where it condenses, transferring the heat rejected during condensation into the water within the hot water reservoir. The condensed liquid naturally falls back into the lower reservoir portion of the heat transfer device to be subsequently reboiled. The condenser portion of the heat transfer device in the FIG. 1 embodiment is generally cylindrical and projects into the hot water reservoir in order to have a large condenser surface area to transfer energy to the water within the hot water reservoir. The heat transfer device is provided with an over-pressure safety valve 118 to assure that the liquid within the heat transfer device is discharged to atmosphere in the event that the pressure within the enclosed heat transfer device exceeds a safe operating range.

Additionally, the wall of the heat transfer device can be fabricated using a double wall construction with the space between the walls vented to atmosphere to further ensure that any leak in the heat transfer glass wall will not result in the liquid contained therein mixing with the water within the hot water heater. If the operating liquid in the heat transfer device is water, then a leak in the heat transfer device wall does not propose a safety problem. If a liquid other than water is utilized, adequate precautions must be taken to ensure that the apparatus will fail in a safe mode where no liquid from the heat transfer device will enter the water system.

Figure 2:
FIG. 2 is an electrical control diagram for the water heating apparatus of FIG. 1.
Figure 4:
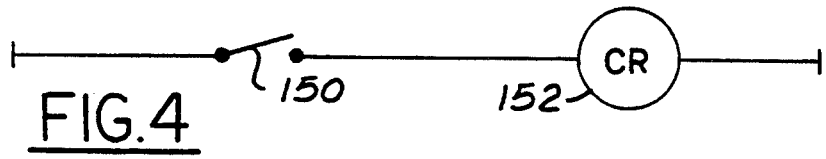
FIG. 4 is an electrical control diagram for the second heater embodiment of FIG. 3.

The electrical control circuit for the hot water heater 100 shown in FIG. 1 is illustrated in FIG. 2. Temperature switch 120 which is located in the hot water reservoir wall senses the temperature of the water in the reservoir. Switch 120 directly controls the operation of heating element 116. Switch 120 is of conventional design and utilized on electric hot water heaters. The switch will have a nominal operating range of approximately 130° with a fairly small hysteresis band so that, for example, the heater will come on at 128° and turn off at 132°. Of course, different nominal temperatures and wider or narrower hysteresis bands can be utilized as desired.

Temperatures significantly less than 130° F. are not desirable since there are some types of bacteria can survive at 120° F. An operating temperature significantly above 130° F. is also undesirable as the higher temperature poses the potential danger of scalding a user of hot water and the added temperature differential causes higher heat losses to the atmosphere.

Figure 3:
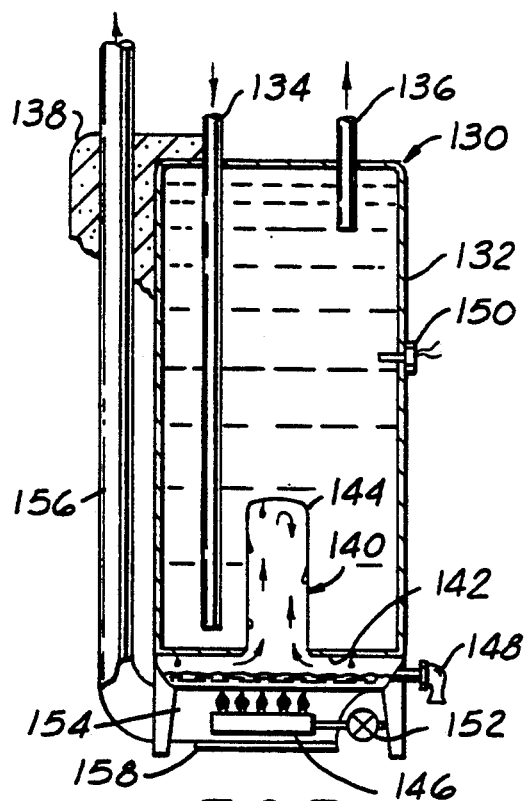
FIG. 3 is a cross-sectional side elevation of a gas heated second embodiment of the invention.

FIG. 3 illustrates a second embodiment of the invention. Hot water heater 130 is provided with a hot water reservoir 132 having an inlet 134 and an outlet 136 similar to reservoir 102 and inlet 104 and outlet 106 described with reference to the first embodiment of the invention.

Insulation 138 is provided around the entire outer periphery of the hot water heater to minimize the heat loss. Heat transfer device 140 is provided beneath the hot water reservoir 132. The heat transfer device 140 is enclosed and filled with a liquid having a boiling point above the selected operating temperature of the hot water heater. The heat transfer device is with a lower reservoir portion 142 and an upper condenser portion 144. A gas burner 146 heats the reservoir portion of the enclosed heat transfer device 140 to boil the operating liquid contained therein. Like the first embodiment, the enclosed heat transfer device 140 is provided with an over-pressure relief valve 148. A hot water reservoir temperature sensor 150 is also provided. In operation, hot water heater 130 functions similar to hot water heater 100 described previously. When the temperature falls below the operating range, temperature switch 150 closes the supplying power to the control relay of gas solenoid valve 152. The gas is ignited by a conventional pilot light or igniter (not shown) and the operating liquid within enclosed heat transfer device 140 is boiled. The exhaust gas is collected by shroud 154 which thus surrounds the burner assembly and is carried away by duct 156. An air inlet 158 is provided in the bottom of shroud 154 so that air can be provided to the gas burner 146.

Figure 5:
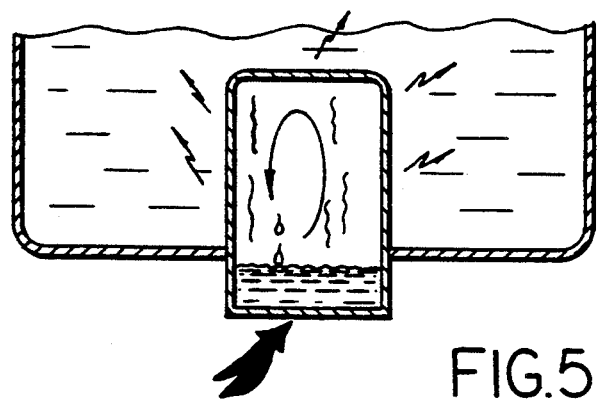
FIG. 5 is a sketch depicting the flow of energy in the working fluid in the water heating systems shown in FIGS. 1 and 3.

In both the first and second embodiments of the invention, hot water heater 100 and hot water heater 130 operate on a similar principal which is schematically illustrated in FIG. 5. An enclosed heat transfer device which is partially filled with liquid is in heat transfer cooperation with an enclosed hot water reservoir. The enclosed heat transfer reservoir has a lower reservoir portion for accumulating the operating liquid at a relatively higher condenser portion in heat transfer relation with the water within the hot water reservoir. As the liquid within the heat transfer device is boiled as a result of energy input into the lower reservoir portion, the vapor rises into the condenser portion where it condenses transferring the heat rejected into the hot water reservoir. Electric heating element 116 and gas burner 146 provide heating means for boiling the liquid within the heat transfer device reservoir portion. The operation of the heating means is regulated by a control means which is responsive to the temperature of the water within the hot water reservoir.

Combined Hot Water Heater and Distilling Apparatus Embodiment

With reference to FIGS. 6–8, a combined hot water heating and distilling apparatus will be described. Hot water heater and distiller 160 represents a third embodiment of the invention which has a great many similar characteristics of the hot water heaters 100 and 130 described previously. Rather than using a totally sealed heat transfer device, heater-distiller 160 utilizes a heat transfer device having water as an operating liquid in which distilled water can be removed for household use. In order to maintain the heat transfer device in operation, undistilled water is introduced into the evaporator portion of the heat transfer device to replenish the water removed for household use.

Water heater-distiller 160 is provided with a hot water reservoir 162 having an inlet 164 and an outlet 166. Insulation 168 covers the entire outer periphery of the hot water reservoir 162. Mounted below the hot water reservoir is evaporator pre-chamber assembly 170. The evaporator pre-chamber assembly has an evaporator tank portion 172 and a circular pre-chamber portion 174 coaxially oriented thereabout. Located within the evaporator tank is an electric heating element 176. The heating element is preferably located a substantial distance above the bottom of the evaporator tank to provide a region to accumulate sediment. The evaporator tank 172 is provided with a water inlet 178 and a steam outlet 180. Steam outlet 180 is removably coupled to steam outlet pipe 182. Steam outlet pipe channels the steam generated in the evaporator into condenser 184. Condenser 184 is a closed-end cylindrical member projecting upwardly into the hot water reservoir in a similar fashion to the heat transfer device described with reference to the first and second embodiments of the invention.

Steam generated within the evaporator is condensed within the condenser for forming distilled water. The condenser provides a means for condensing the steam into distilled water while transferring the heat rejected during condensation to the water within the hot water reservoir 162. The distilled water formed in the condenser 184 flows downwardly and naturally due to gravity and is accumulated in distilled water reservoir 186. Preferably, the distilled water reservoir is formed immediately below the hot water reservoir as illustrated in FIG. 6 with the condenser 184 formed in the common wall therebetween.

Steam outlet pipe 182 extends through the reservoir and is aligned with the condenser 184. The steam outlet pipe also serves to control the maximum level of the water within the distilled water level. Once the water level exceeds the height of the steam outlet pipe, further production of distilled water will cause the excess distilled water which cannot be stored within the distilled water reservoir to automatically flow back through the steam outlet pipe returning to the evaporator tank 172. In order to prevent the steam from condensing within the steam outlet pipe, a steam outlet pipe is provided with insulation 188.

The distilled water reservoir 186 is provided with a distilled water outlet 190 which is coupled to a pump 192. The output of pump 192 is routed to any suitable distilled water using or dispensing apparatus. In a typical household application, distilled water will be provided to faucets adjacent sinks and to ice-making machines. Pump 192 is preferably of the type having an internal pressure sensor to automatically turn the pump on when there is a demand for water. Additionally, the reservoir is provided with a low level sensor 194 and a silver impregnated activated charcoal vent filter 196.

In order to prevent bacteria and other airborne contaminants from entering distilled water reservoir 186 a large flexible plastic bag 195 may be affixed to the reservoir vent which has a variable displacement in excess of the distilled water reservoir capacity. For example, if distilled water reservoir is designed to hold five gallons of water, flexible bag 195 will have a volume equal to or greater than five gallons so that when the reservoir is full, air will be displaced into the bag and when the reservoir is empty the bag will collapse as the air therein returns to the reservoir. The flexible bag 195 prevents unsterilized air which may contain bacteria or other foreign matter from entering the reservoir. During the distillation process, very small amounts of gases, i.e. free hydrogen, nitrogen, oxygen, etc. are generated. It is therefore necessary to provide a check valve 197 which is biased in a closed position to enable excess gas accumulating in the reservoir and flexible bag to escape to atmosphere. Check valve 197 is designed to prevent any air from entering the flexible bag. Preferably, the flexible bag 195 will be oriented significantly above the location of the reservoir vent so that any condensation formed therein will flow back into the reservoir tank.

In operation, when temperature sensor 198 senses that the water within the hot water reservoir 162 is cold, water is boiled within the evaporator tank 172 which supplies steam to the condenser which condenses forming distilled water and rejecting heat into the water within the hot water reservoir. When the temperature sensor exceeds a specified level, the heater is turned off. As long as the distilled water reservoir is not low, the heater-distiller embodiment of the invention 160 operates substantially similar to water heaters 100 and 130 described previously. The water within the evaporator acts as the operating liquid cycling between the evaporator tank 172 and condenser 184 as the water is boiled by the electric heating element 176. As water is removed from the distilled water reservoir, however, the evaporator level will drop proportionally. Water therefore must be periodically added to the evaporator in order to replenish the water transfer to the distilled water reservoir. A number of different systems can be utilized to refill the evaporator. Commonly, water distillers of the prior art have utilized floats or solid state contact type sensors within the evaporator to sense level. The problem with these methods of sensing water level is that sediment building up in the evaporator causes the sensors to malfunction.

In the embodiment illustrated, evaporator temperature sensor 200 is provided to sense the increase in internal tank temperature caused when the evaporator tank water level drops sufficiently to expose the electric heating element 176 which causes solenoid valve 202 to open allowing water to flow from the hot water reservoir into pre-chamber 174 and, in turn, into evaporator 172. Electric heating element 176 is preferably of the ceramic type which will not burn out when heated in air. Pre-chamber 174 and evaporator 172 are connected by a inclined passageway 204 extending therebetween. After a sufficient amount of water has been added to the evaporator tank to lower the temperature of evaporator temperature sensor 200, valve 202 closes and heating resumes on an as needed basis to maintain the water in the hot water reservoir within the selected operating range.

An electrical diagram of the control circuit for heater distiller 160 is illustrated in FIG. 8. In addition to the electrical components previously described, fusible link 206 is provided to prevent over-heating in the event of a malfunction. In normal operation, the evaporator temperature switch 200 will be in the cold position as long as there is water in the evaporator tank. When hot water reservoir switch 198 indicates the hot water tank is cold, a switch will close energizing electric heater 176. The heater will cycle on and off as needed to maintain the temperature within the hot water reservoir in the selected operating range.

Once sufficient distilled water has been used to expose the electric heating element 176, evaporator switch 200 will move to the hot position opening solenoid valve 202 and refilling the evaporator. In the event the hot water reservoir is at or above its high temperature limit and there is a shortage of distilled water, level sensor 194 closes causing the solenoid valve 202 to open. When valve 202 opens as a result of a low distilled water level, hot water from within the hot water reservoir will flow into the evaporator and the water within the hot water reservoir is replaced by cold water lowering the temperature of the water within the hot water reservoir. Valve 202 will remain open until the hot water reservoir temperature drops to the cold limit.

After the evaporator has been filled with water, excess water will overflow through the overflow port 208 to be dumped down a drain. Once the hot water temperature switch 198 returns to the cold position, heater 176 will be energized and more distilled water will be generated. This process will continue until the distilled water reservoir level sensor switch returns to the open or not low level position illustrated. It should be appreciated that alternatively, a float-type liquid level sensor can be installed in the pre-chamber 174 to regulate the operation and system. Overflow port 208 is sized to be capable of excluding more water than valve 202 can supply so that undistilled water can never be forced into distilled water reservoir 186.

The overflow port 208 is also provided with a volatile hydrocarbon vent 210. Pre-chamber 174 is located in close proximity to the heated evaporator tank and the evaporator/pre-chamber assembly is insulated in such a manner so that the pre-chamber and the water contained therein is heated to elevated but sub-boiling temperature during normal operation. By venting the pre-chamber, volatile hydrocarbons are allowed to escape before the water enters the evaporator tank.

Evaporator/pre-chamber assembly 170 of the preferred embodiment is formed of two stainless steel stamped members which are butt-welded together about a circumaxial seam. The orientation of inclined passageway 204 naturally prevents circulation of water between the pre-chamber 174 and the evaporator 172 due to temperature differential. Inclined passageway 204 is a frusto-conical opening extending between the upper and lower sheets of material forming the evaporator/pre-chamber assembly.

Preferably, the evaporator tank is generally elongated enabling the electric heating element to be located relatively high within the evaporator tank so as to provide plenty of space for sediment accumulation below the level of the heating element. The evaporator tank is constructed to provide sufficient volume below the level of the heating element to accumulate the sediment produced by making at least 200 gallons and preferably over 500 gallons of distilled water from a water supply having 500 parts per million (ppm) of dissolved solids. One-third ($\frac{1}{3}$) of the volume of the evaporator tank and preferably $\frac{1}{2}$ of the volume of the evaporator tank should be below the electric heating element when the evaporator tank is full and there is no sediment yet in place. Utilizing a 2-$\frac{1}{2}$ gallon evaporator tank and an electric heating element orientation as previously described, a year's worth of sediment can be accumulated in a household system in a region of the country having an average water hardness (500 ppm).

The evaporator/pre-chamber assembly is designed to be removed for periodic cleaning. Ideally, the evaporator will be exchanged so that the typical homeowner will not have to purchase or handle the acid typically used to dissolve accumulated sediment. An elastic grommet 212 is preferably provided at the steam outlet 180 in the evaporator tank to securely seal the steam outlet 180 to steam outlet pipe 182. To remove the evaporator/pre-chamber assembly, the water inlet of pipe 214 must be disconnected and the overflow port 208 removed so that the entire evaporator/distiller assembly can be moved radially outward in the direction of the large arrow as shown in FIG. 6.

Water Cooled Distilling Apparatus

Figure 9:
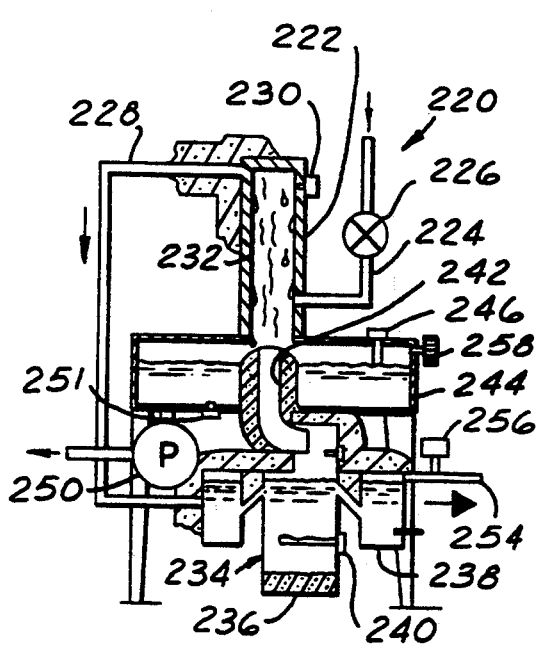
FIG. 9 is a cross-sectional side elevation of the distilling apparatus providing a fourth embodiment of the invention.
Figure 10:
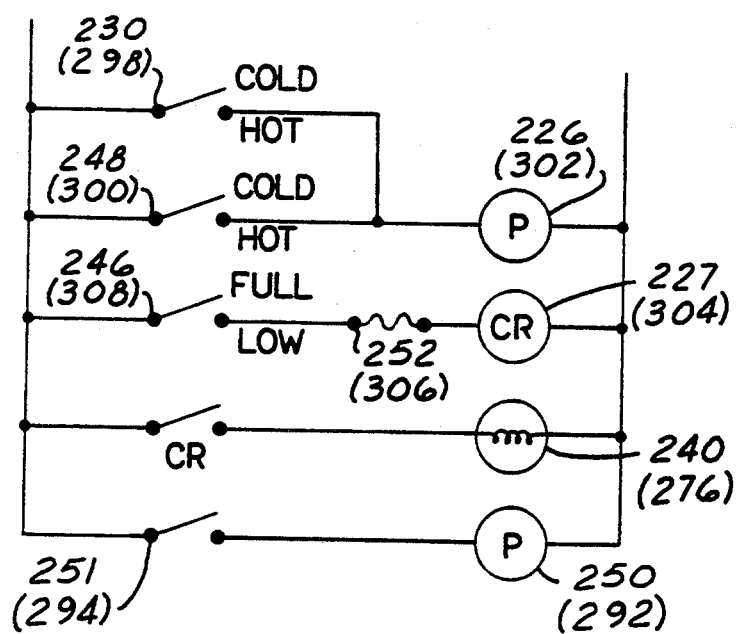
FIG. 10 is an electrical control diagram for the apparatus of FIG. 9.

With reference to FIGS. 9 and 10, a water distiller 220 representing a fourth embodiment of the invention is shown. The water distiller is fabricated using a great many common parts of water heater-distiller 160 described previously. Water distiller 220 is a relatively low cost distilling apparatus which dumps the latent heat of evaporation down the drain in typical prior art fashion. The water distilling apparatus 220 however, utilizes a novel evaporator mechanism. Water distiller 220 is useful in limited applications where size and initial capital investment are of primary concern.

It should be appreciated that unless the energy in the waste water can be put to some useful use, distiller 220 will have a rather high operating cost per gallon of distilled water produced. Instead of a hot water reservoir to absorb heat rejected during condensation, a water jacket 222 is provided having an inlet 224 coupled to a source of pressurized water by a solenoid valve 226. The water jacket is also provided with an outlet 228 for hot water and a temperature sensor 230 to sense a temperature of the water within water jacket 222. Water jacket 222 surrounds condenser 232 to define a hollow cylinder cavity therebetween. Evaporator/pre-chamber assembly 234 having evaporator 236, pre-chamber 238 and electric heating element 240 similar to the previously described components of heater-distiller 160. The evaporator tank 236 is provided with a steam outlet removably coupled to steam outlet pipe 242. Steam outlet pipe 242 projects upwardly through distilled water reservoir 244 and is aligned coaxially with condenser 232. As steam is condensed within the condenser, distilled water falls into the distilled water reservoir 244.

In FIG. 9 embodiment, distilled water will never overflow back into the evaporator since the evaporator serves solely to create distilled water and not heat water within the hot water reservoir. Once the distilled water reservoir is full, level sensor 246 will move to the full position. Evaporator temperature sensor 248 and pump 250 complete the various elements of the electrical control circuit shown schematically in FIG. 10. Reservoir low level sensor 251 is provided in series with pump 250 to present the pump from running when the reservoir is empty. Whenever the evaporator needs water indicated by evaporator temperature sensor 248 moving to the hot position, solenoid valve 226 will open, refilling the evaporator. Solenoid valve 226 also opens whenever the water within the water jacket exceeds an upper temperature limit. The upper temperature limit should be selected so that there is adequate temperature differential in the condenser to condense the steam generated in the evaporator without undue increase in reservoir pressure.

Heater 240 is operated by control relay 227 which is in series with fusible link 252 and reservoir level sensor 246. The heater will operate as long as the reservoir level is low. Reservoir level sensor 246 will have a slight hysteresis preventing the heater from coming on and off every time a small amount of water is used.

Pre-chamber 238 is provided with an overflow port 254 and a volatile hydrocarbon vent 256 which functions in the manner described previously. Reservoir 244 is likewise provided with a vent 258 to maintain the reservoir at atmospheric pressure. As previously described, reservoir vent 258 is preferably of the silver activated charcoal type in order to prevent bacteria from entering the reservoir.

Water Distiller For Use In Conjunction With A Separate Hot Water Heater

Figure 11:
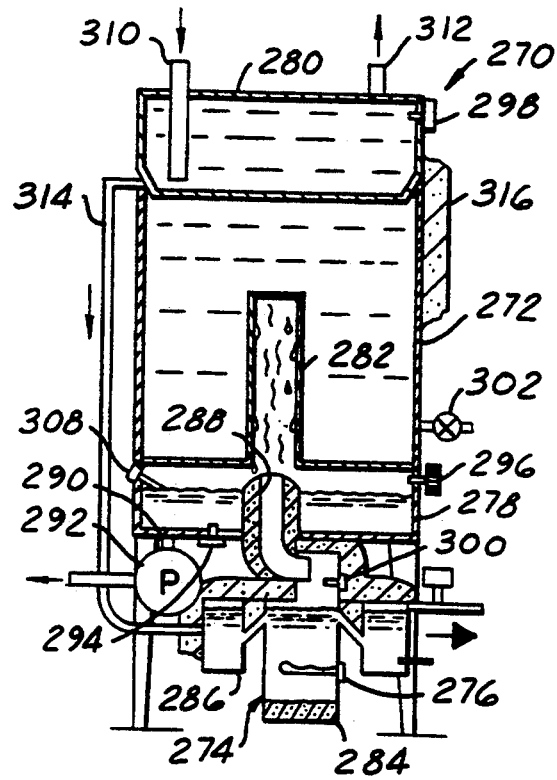
FIG. 11 is a cross-sectional side elevation of the distilling apparatus providing a fifth embodiment of the invention.

Water distiller 270 shown in FIG. 11 is intended to be used in conjunction with a conventional hot water heater (not shown) in a manner generally similar to the water distilling apparatus of U.S. application Ser. No. 282,026. Distiller 270 represents a fifth embodiment of the present invention as it utilizes the novel evaporator/pre-chamber design as well as other features unique to the present invention. Distiller 270 is made up of a heat storage tank 272, an evaporator/pre-chamber assembly 274 having an electric heating element 276 therein, a distilled water reservoir 278, a heat exchanger 280, and a condenser 282. Evaporator/pre-chamber assembly 274 includes an evaporator tank 284 and a pre-chamber 286 which are connected together by an inclined passageway in a manner similar to the third and fourth embodiments of the invention described previously.

Evaporator tank 284 is provided with a steam outlet connected to a steam outlet pipe 288. The steam outlet pipe projects vertically through reservoir 278 and is aligned coaxially with condenser 282. The distilled water reservoir is provided with an outlet 290 which is connected to a pump 292, a reservoir high level sensor 308, and a reservoir vent filter 296.

The control circuit utilized to regulate the operation of distiller 270 is substantially similar to the control circuit utilized by the fourth embodiment of the invention distiller 220. The control circuit for distiller 270 is shown in FIG. 10. The numbers in parenthesis refer to the components of distiller 270. It should be appreciated that a wide number of electrical control schemes can be utilized. In the simplified control scheme shown in FIG. 10, the system is intended to maintain the reservoir substantially full of distilled water at all times. This will periodically necessitate dumping water to remove waste heat by opening the solenoid valve 302 when the heat exchanger temperature sensor 298 indicates that the heat exchanger is over temperature.

Valve 302 is also opened when evaporator temperature sensor 300 becomes hot indicating the evaporator needs to be refilled. Electric heater 276 will be energized by control relay 304 which is in series with fusible link 306 and a reservoir high level sensor 308. Reservoir low level sensor 294 is provided in series with pump 292 to prevent the pump from running when the reservoir is empty.

Alternatively, distiller 270 can be operated using a control scheme of the type illustrated in FIG. 8 which is used by hot water heater distiller 160. The FIG. 8 control scheme allows the reservoir level to fluctuate between a low level and a full level established by the height of steam outlet pipe 288. The control system maintains the temperature of the water within heat exchanger 280 within a desired operating range. Heat exchanger 280 is provided with a cold water inlet 310 which is coupled to a source of pressurized water and a hot water outlet 312 which is connected to the inlet of a typical hot water heater. As hot water is consumed in a hot water heater (not shown) and it calls for more water, cold water enters heat exchanger 280 via inlet 310 which drops the temperature of the water within the heat exchanger 280. Utilizing the control system illustrated in FIG. 8, the water distiller 270 will try to provide as much of the hot water heating capability as possible, thereby shifting the energy consumption from the hot water heater to the distilling apparatus. By using this control scheme, distilled water production and available hot water will be maximized.

In operation, as water is boiled within the evaporator, steam passes through steam outlet pipe 288 and enters condenser 282 where it is condensed to form distilled water. The distilled water is accumulated in the distilled water reservoir 278 and the heat rejected during condensation is passed to the water within heat storage tank 272. Heat storage tank 272 is maintained at atmospheric pressure. When solenoid valve 302 opens, water is introduced into the heat storage tank 272 causing it to displace hot water from the upper region of the heat storage tank into conduit 314 which connects the heat storage tank to pre-chamber 286. The heat storage tank 272 is provided with a common wall with heat exchanger 280 to allow energy to be freely transferred therebetween. Heat exchanger 280 is of a simple construction and is an enclosed reservoir capable of withstanding high water pressures. Ideally, all of the tanks utilizing the present invention will be formed of stainless steel or other corrosion resistant material capable of withstanding the requisite pressures. It is possible to form some of the low pressure tanks such as heat storage tank 272 and reservoir 278 of high purity low strength plastic since those tanks are always maintained at atmospheric pressure.

As with the previous embodiments of the invention, the entire distilling apparatus is coated with a suitable insulation material 316 to prevent energy loss to the atmosphere.

Alternative Combination Heater Distiller Embodiment

Figure 12:
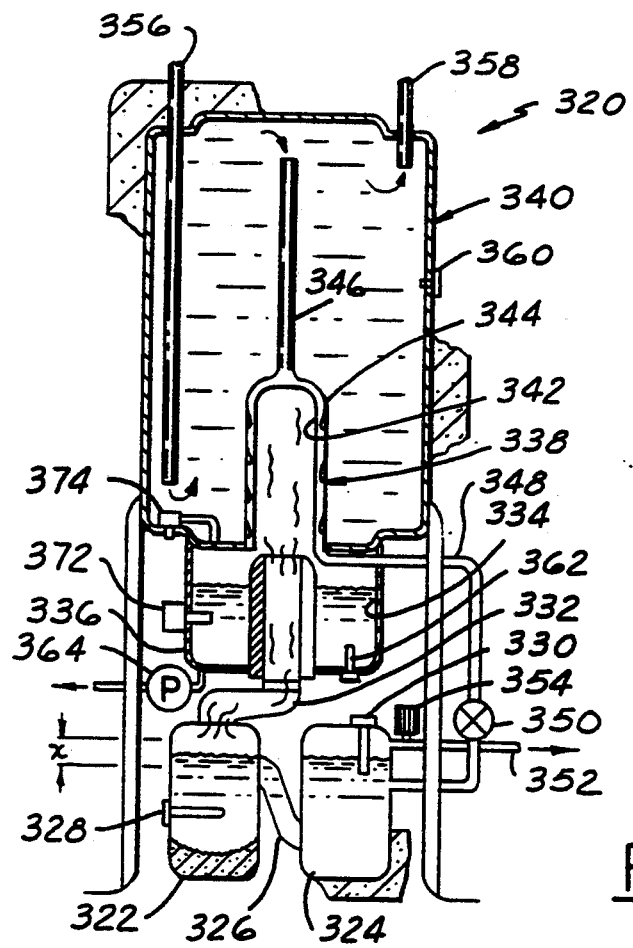
FIG. 12 is a cross-sectional side elevation of a combination water heating and distilling apparatus providing a sixth embodiment of the invention.

Water heater/distiller 320 is a sixth embodiment of the invention shown in FIG. 12 which functions somewhat similar to heater-distiller 160 in FIG. 6. Heater-distiller 320 however, uses separate tanks to form evaporator 322 and pre-chamber 324. Evaporator 322 and pre-chamber 324 are oriented in side-by-side relation and connected by a diagonal conduit 326 which extends therebetween. The inclined orientation of diagonal conduit 326 prevents counterflow of water between the two tanks due to the temperature differential. Preferably, diagonal conduit 326 is formed of a molded rubber-like material to facilitate easy attachment and removal of the conduit to the two tanks. Evaporator tank 322 is preferably formed of stainless steel and is generally cylindrical in shape with a 2-½ to 3 gallon capacity. Electric heating element 328 is provided which projects into the tank approximately mid-way between the tank full level and the tank bottom. Utilizing a high electric heating element orientation enables plenty of sediment to accumulate at the bottom of the tank without hindering heating element operation.

The level of the water within evaporator 322 is sensed utilizing a liquid level sensor oriented in pre-chamber 324. The level of the water within evaporator 322 and pre-chamber 324 will be constant at all times and will vary through a range X indicated. The water inlet to the evaporator tank 322 is sufficiently below the operating level of the tanks so that the pre-chamber evaporator tanks are always in communication with one another. By sensing the evaporator level in pre-chamber 324, a typical float-type level sensor 330 can be utilized without having sediment accumulation problems.

Evaporator tank 322 has an outlet coupled to the elastic conduit 332 which is also formed of a pliable rubber-like material. Elastic conduit 332 connects the outlet of the evaporator tank 322 to steam outlet pipe 334 which is oriented vertically within distilled water reservoir 336. Steam outlet pipe 334 is aligned coaxially with condenser 338 which project within hot water tank 340. Condenser 338 is a generally cylindrical member having a double wall construction. Inner wall 342 is integral with the lower wall of the hot water tank 340 and serves to separate the hot water tank from the distilled water reservoir. Outer wall 344 cooperates with inner wall 342 to define a thin water jacket therebetween. Standpipe 346 is affixed to the upper portion of outer wall 344 to define a water inlet in a region of the top of the hot water tank. Preferably, outer wall 344 is provided with a helical groove formed therein in order to define a helical flow path for water about the periphery of cylindrical inner wall 342. Oriented within the bottom of the cavity bounded by the inner and outer walls 342 and 344, is an outlet port connected to discharge pipe 348. Discharge pipe 348 is in turn connected to the pre-chamber tank 324 and a flow of water therethrough is controlled by solenoid valve 350. The double wall construction of condenser 338 assures that the water entering pre-chamber 324 is as hot as possible thereby maximizing operating efficiency. As in the previous embodiments, pre-chamber 324 is provided with an overflow 352 and a volatile hydrocarbon vent 354.

Figure 13:
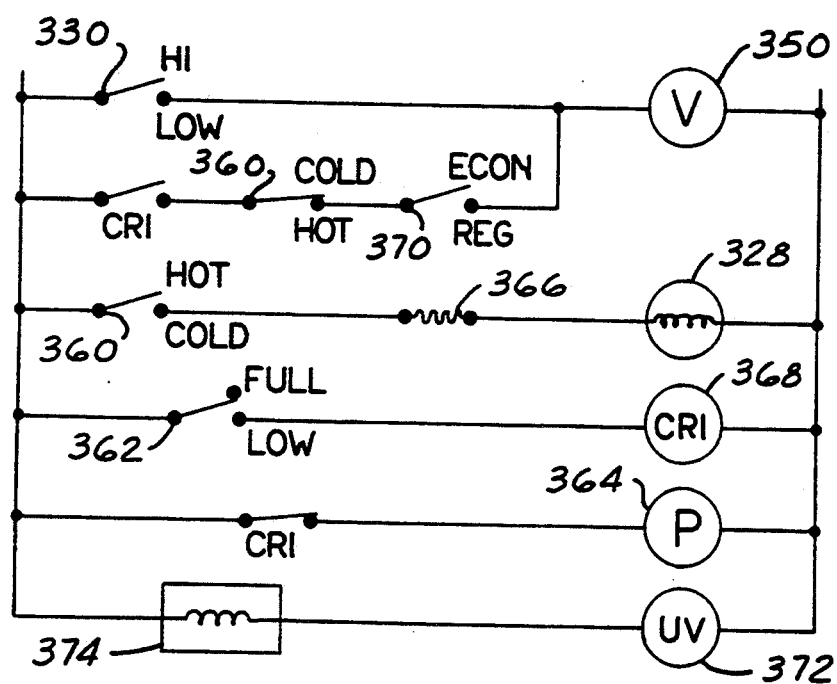
FIG. 13 is an electrical control diagram for the combination water heating and distilling apparatus of FIG. 12.

Hot water tank 340 has a cold water inlet 356 and a hot water outlet 358 for connection to a typical building hot water system. Hot water tank 340 is provided with a temperature sensor 360, distilled water reservoir 336 is provided with a low level sensor 362, and a pump 364 connected to the reservoir outlet, similar to heater distiller 160 described previously. The operation of the system is also substantially similar to heater distiller 160. Temperature sensor 360 regulates the operation of electric heating element 328 which, along with fusible link 366, are in a series together as shown in FIG. 13. Temperature switch 360 as illustrated in the electrical diagram of FIG. 13 is a double pole switch. The first pair of contacts are normally closed when the switch senses hot, and the other pair of contacts are normally open when the switch senses hot. When the switch senses cold, both pairs of contacts change condition. Temperature sensors for hot water heaters of this type are commercially available in various temperature ranges.

Reservoir level sensor 362 is in series with control relay 368. Control relay 368 acts to interrupt the power to pump 364 when the water is low and to open solenoid valve 350 to dump hot water in the event the temperature sensor 360 indicates the hot water tank 340 is hot. By dumping hot water, tank temperature can be lowered sufficiently to allow the production of additional distilled water without causing the temperature of the water within the hot water tank to exceed a safe level. This mode of operation ensures that there will always be some distilled water in the distilled water reservoir even if it means some energy will on occasion be wasted.

In the event the operator of the system does not want to dump hot water, but would rather occasionally run out of distilled water, an economy mode switch 370 is provided as illustrated in the second line of the FIG. 13 latter diagram. When mode switch 370 is in the economy position, solenoid valve 350 will only be opened in response to evaporator level sensor 330 switching to a low position. When economy switch 370 is in the regular position whenever the water within the hot water reservoir is hot and the distilled water reservoir level is low, valve 350 will open allowing hot water to be dumped until the temperature of the tank drops to the cold level or the distilled water reservoir increases sufficiently.

It should also be noted that the double wall construction of the condenser 338 enables the water which is discharged to be at a temperature which exceeds the high level limit of temperature sensor 360. By maintaining the discharge water as hot as possible, not only does it enhance the removal of hydrocarbons, but it minimizes the amount of water which must be wasted in order to remove a specified amount of energy from the hot water tank. Ideally, the flow of water through valve 350 will be adjusted to maximize the temperature of the discharge water.

In order to inhibit bacterial growth in the water within distilled reservoir 336, the distilled water reservoir 336 is shown equipped with an ultra-violet light 372 which projects within the interior of the reservoir as well as a heated vent 374. It is to be appreciated that these devices provide a similar function and, for economy purposes, only one would typically be installed in a hot water heater distiller. The ultra-violet light 372 would be continuously operated or intermittently operated utilizing a timer to ensure that there is no bacterial growth inside the distilled water reservoir. In normal operation, there should be no bacterial growth within the distilled water reservoir. However, in some vacation homes where the system may sit unused for months at a time, a low power ultra-violet light either running continuously or periodically on a timer can effectively inhibit bacterial growth within the distilled water reservoir. If the system is not used for extensive periods of time, it is recommended that the distilled water reservoir be drained and the system restarted so that hot steam completely kills any bacterial growth which may have developed during the extended period of non-use. The ultra-violet light, even when run on a timer, consumes a significant amount of energy which is not effectively recovered.

As an alternative to the ultra-violet light, a heated vent 374 can be provided to sterilize all of the air entering the reservoir, thereby effectively preventing any bacterial matter from contaminating the reservoir. When the system is initially turned on, the distilled water reservoir will be dry and the steam entering the system will sterilize the entire interior of the distilled water reservoir condenser. In operation, thereafter, all air entering or exiting the reservoir through the vent will have to pass through a heated orifice where the air will be heated sufficiently to kill any live bacteria. By orienting the heated vent substantially within the hot water reservoir, waste heat can be utilized to maintain the water within the hot water reservoir at its desired operating temperature. A UV light sterilized vent can also be used to provide a similar function.

Ideally, the heated vent will have a very low power output which is substantially equal to the conductive losses from the hot water reservoir to atmosphere. In order to further conserve energy, a dual vent may be provided with appropriate check valves so that the air exiting the reservoir is not heated, only the air entering the reservoir. In addition, a suitable filter can be provided to be a heated vent as illustrated on some of the previous embodiments in order to prevent dust and particular matter from entering the distilled water reservoir.

While the best modes for carrying out the invention have been described in detail, those familiar with the art to which the invention relates will recognize various alternative designs and embodiments for practicing the invention as defined by the following claims.

I claim:

1. An automatic water heating and distilling apparatus comprising:
   an enclosed hot water reservoir for storing hot water, and having a water inlet and a hot water outlet;
   an evaporator tank having a water inlet, a steam outlet, and a heating means for boiling water therein;
   condenser means for condensing the steam provided by the evaporator to form distilled water and to transfer the heat rejected during condensation to the water within the hot water reservoir;
   a distilled water reservoir for storing distilled water and having an inlet coupled to the condenser means, an outlet for distilled water, and means for automatically returning excess distilled water which cannot be stored within the distilled water reservoir to the evaporator tank to be reboiled;
   temperature sensor means for sensing the temperature of the water in the hot water reservoir;
   control means for regulating the operation of the heating means in response to the temperature sensor means to boil additional water thereby heating the water within the hot water reservoir to maintain the water above a selected low operating temperature limit; and
   wherein said distilled water reservoir is located below the condenser means and said evaporator tank is located sufficiently below the distilled water reservoir so that gravity will naturally cause condensation formed in the condenser to flow into the distilled water reservoir and to cause excess distilled water to flow from the reservoir back to the evaporator tank.

2. The apparatus of claim 1 wherein said distilled water reservoir is located directly below and affixed to the hot water reservoir with a common wall therebetween which serves as the condenser means.

3. The apparatus of claim 2 further comprising a steam outlet pipe extending through the distilled water reservoir, said outlet pipe cooperating with the evaporator tank steam outlet to direct steam to the condenser means.

4. The apparatus of claim 2 wherein said distilled water reservoir outlet further comprises a steam outlet pipe extending between the reservoir and the evaporator tank steam outlet to direct steam from the evaporator tank to the condenser means and to allow excess distilled water in the distilled water reservoir to return to the evaporator tank.

5. The apparatus of claim 1 further comprising a heat exchanger in thermal cooperation with the water within the hot water reservoir for extracting heat therefrom, said heat exchanger having a water inlet to be coupled to a source of pressurized water and a hot water outlet.

6. The apparatus of claim 5 wherein said hot water reservoir is maintained at substantially atmospheric pressure and has an upper region in which the hot water reservoir water outlet is oriented to allow water rising above an upper level to flow therethrough.

7. The apparatus of claim 6 further comprising an enclosed prechamber having a prechamber water inlet coupled to the hot water reservoir water outlet, and a prechamber water outlet coupled to the evaporator water inlet, said prechamber laterally oriented relative to the evaporator at a height which causes the prechamber to be partially filled with water having a level substantially equal to that of the water level in the evaporator.

8. The apparatus of claim 7 wherein said prechamber is further provided with an atmospheric vent to enable volatile hydrocarbons in the water contained therein to evaporate prior to the water entering the evaporator.

9. The apparatus of claim 7 further comprising a remotely operable water valve cooperating with the control means for selectively coupling the hot water reservoir inlet to a source of pressurized water thereby refilling the evaporator tank.

10. An automatic water heating and distilling apparatus comprising:
  a hot water reservoir having an inlet for pressurized water and an outlet for pressurized domestic hot water;
  a temperature sensor for sensing the temperature of the water within the hot water reservoir;
  an evaporator tank having a water inlet, steam outlet and heating means for boiling water therein;
  condenser means for condensing the steam provided by the evaporator tank steam outlet to form distilled water and to transfer the heat rejected during condensation to the water within the hot water reservoir;
  a distilled water reservoir for storing the distilled water condensed by the condenser means having an inlet coupled to the condensing means, an outlet for distilled water, and means for automatically returning excess distilled water which cannot be stored within the distilled water reservoir to the evaporator tank to be reboiled;
  a level sensor for sensing the water level within the distilled water reservoir;
  a solenoid activated hot water reservoir outlet valve cooperating the level sensor to drain water from the hot water reservoir to lower the temperature thereof so additional distilled water can be produced without causing the temperature of the water within the hot water reservoir to exceed a selected upper temperature level;
  control means for regulating the operation of the heating means in response to the temperature sensor to maintain the water within the hot water reservoir above a selected low operating temperature inlet; and
  wherein said distilled water reservoir is located below the condenser means and said evaporator tank is located sufficiently below the distilled water reservoir so that gravity will naturally cause condensation formed in the condenser to flow into the distilled water reservoir and to cause excess distilled water to flow from the reservoir back to the evaporator tank.

11. The apparatus of claim 10 further comprising an evaporator tank level sensor cooperating with the solenoid activated valve wherein the water drained from the hot water reservoir is provided to the evaporator tank water inlet and wherein the evaporator tank is further provided with an overflow port to allow excess water to be removed therefrom, said evaporator tank level sensor cooperating with the solenoid activated valve to maintain the water level in the evaporator within a predetermined range.

12. The apparatus of claim 10 further comprising a prechamber tank positioned adjacent the evaporator tank and having a water passageway connected therebetween, said prechamber provided with a level sensor to enable the level of the evaporator tank to be remotely monitored in the prechamber tank which is substantially free of sediment accumulation.

13. The apparatus of claim 12 wherein said prechamber tank is further provided with an atmospheric vent to enable volatile hydrocarbons within the water to escape prior to entering the evaporator tank.

14. A water heating and distilling apparatus comprising:
  an enclosed cyclindrical hot water reservoir for storing pressurized water, having a pressurized water inlet and an outlet for pressurized hot water;
  an evaporator tank having a water inlet; a steam outlet and heating means for boiling water therein;
  said cylindrical hot water reservoir having a lower wall which is provided with an upwardly extending recessed cavity having a common inlet and outlet for steam and distilled water, said recessed cavity forming a condenser for condensing the steam provided by the evaporator tank steam outlet to form distilled water and to transfer the heat rejected during condensation into the water within the hot water reservoir; and
  a distilled water reservoir for storing distilled water having an inlet coupled to the condenser and an outlet for distilled water, said distilled water reservoir being affixed to the lower wall of the hot water reservoir which forms the upper wall of the distilled water reservoir.

15. The apparatus of claim 14 wherein said hot water reservoir and said distilled water reservoir are coaxially aligned right circular cylinders.

16. An automatic water heating and distilling apparatus comprising:
  an enclosed hot water reservoir for storing hot water;
  a heat exchanger in thermal cooperation with the water in the hot water reservoir to extract heat therefrom, said heat exchanger having a water inlet to be coupled to a source of pressurized water and a water outlet;
  an evaporator tank having a water inlet, a steam outlet, and heating means for boiling water therein;
  condenser means for condensing the steam provided by the evaporator tank steam outlet to form distilled water and to transfer the heat rejected during condensation to the water within the hot water reservoir;
  a distilled water reservoir for storing distilled water and having an inlet coupled to the condenser means, an outlet for distilled water, and means for automatically returning excess distilled water to the evaporator tank;
  a temperature sensor in thermal cooperation within the hot water reservoir;
  control means for regulating the operation of the heating means in response to the temperature sensor to maintain the water within the hot water reservoir above a selected low operating temperature limit; and
  wherein said distilled water reservoir is located below the condenser means and said evaporator tank is located sufficiently below the distilled water reservoir so that gravity will naturally cause condensation formed in the condenser to flow into the distilled water reservoir and to cause excess distilled water to flow from the reservoir back to the evaporator tank.

17. The apparatus of claim 16 further comprising a remotely operable water valve wherein said hot water reservoir further comprises a water inlet and a hot water outlet, said water inlet coupled to the remotely operable water valve and a source of pressurized water to enable water to be admitted into the enclosed hot water reservoir, said hot water outlet being coupled to the evaporator tank water inlet enabling the filling of the evaporator tank to be regulated by the remotely operable water valve.

* * * * *

UNITED STATES PATENT AND TRADEMARK OFFICE
CERTIFICATE OF CORRECTION

PATENT NO. : 5,348,623
DATED : September 20, 1994
INVENTOR(S) : MICHAEL E. SALMON It is certified that error appears in the above-identified patent and that said Letters Patent is hereby corrected as shown below:

Column 2, Line 58

Before "heater" insert --a--.

Column 5, Line 4

Before "with" insert --provided--.

Column 8, Line 14

Delete "excluding" and insert --exhausting--.

Signed and Sealed this

Twenty-first Day of October 1997

Attest:

BRUCE LEHMAN

*Attesting Officer*      *Commissioner of Patents and Trademarks*